(12) United States Patent
Tang et al.

(10) Patent No.: US 10,893,429 B2
(45) Date of Patent: Jan. 12, 2021

(54) UPLINK MEASUREMENT SIGNAL INDICATION METHOD AND APPARATUS

(71) Applicant: HUAWEI TECHNOLOGIES CO., LTD., Guangdong (CN)

(72) Inventors: Xiaoyong Tang, Shenzhen (CN); Xi Zhang, Shenzhen (CN); You Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 12 days.

(21) Appl. No.: 16/229,938

(22) Filed: Dec. 21, 2018

(65) Prior Publication Data

US 2019/0124538 A1    Apr. 25, 2019

Related U.S. Application Data

(63) Continuation of application No. PCT/CN2018/071272, filed on Jan. 4, 2018.

(30) Foreign Application Priority Data

Jan. 5, 2017   (CN) .......................... 2017 1 0007683

(51) Int. Cl.
*H04W 24/10* (2009.01)
*H04W 72/04* (2009.01)
(Continued)

(52) U.S. Cl.
CPC .......... *H04W 24/10* (2013.01); *H04L 5/0048* (2013.01); *H04W 16/28* (2013.01);
(Continued)

(58) Field of Classification Search
None
See application file for complete search history.

(56) References Cited

U.S. PATENT DOCUMENTS 9,843,974 B1 * 12/2017 Touboul ............... H04B 7/0623
2014/0148182 A1 * 5/2014 Jeong .................... H04L 5/0026
455/452.1
(Continued)

FOREIGN PATENT DOCUMENTS

CN    101384055 A    3/2009
CN    101500264 A    8/2009
(Continued)

OTHER PUBLICATIONS

R1-1609691 Xinwei,"Beam Management Views and Designs",3GPP TSG RAN WG1 Meeting #86b, Lisbon, Portugal, Oct. 10-14, 2016,total 11 pages.
(Continued)

*Primary Examiner* — Bunjob Jaroenchonwanit
(74) *Attorney, Agent, or Firm* — Fish & Richardson P.C.

(57) ABSTRACT

The present disclosure relates to example uplink measurement signal indication methods and apparatuses. One example method includes receiving, by a terminal device, signaling sent by a network device, where the signaling carries indication information that indicates a transmit beam for sending an uplink measurement signal by the terminal device, and sending, by the terminal device, the uplink measurement signal to the network device based on the indication information by using the transmit beam.

19 Claims, 4 Drawing Sheets

(51) Int. Cl.
  *H04L 5/00* (2006.01)
  *H04W 16/28* (2009.01)
(52) U.S. Cl.
  CPC ........ *H04W 72/042* (2013.01); *H04W 72/046* (2013.01); *H04W 72/0413* (2013.01)

(56) References Cited

U.S. PATENT DOCUMENTS

| | | | | |
|---|---|---|---|---|
| 2016/0099763 | A1* | 4/2016 | Chen | H04B 7/063 370/329 |
| 2016/0174244 | A1* | 6/2016 | Kim | H04W 72/1284 370/329 |
| 2016/0352403 | A1* | 12/2016 | Kishiyama | H04B 7/0695 |
| 2016/0359536 | A1* | 12/2016 | Guo | H04B 7/063 |
| 2017/0026102 | A1 | 1/2017 | Guo et al. | |
| 2017/0347391 | A1* | 11/2017 | Tenny | H04B 7/0617 |
| 2018/0235013 | A1* | 8/2018 | Jung | H04W 16/28 |
| 2018/0332508 | A1* | 11/2018 | Axelsson | H04B 7/0695 |
| 2019/0045377 | A1* | 2/2019 | Kakishima | H04W 16/28 |
| 2019/0280786 | A1* | 9/2019 | Luo | H04W 24/08 |
| 2019/0281563 | A1* | 9/2019 | Lee | H04L 5/00 |
| 2019/0285723 | A1* | 9/2019 | Huang | G01S 5/0226 |
| 2019/0306886 | A1* | 10/2019 | Choi | H04W 74/00 |
| 2020/0037310 | A1* | 1/2020 | Islam | H04B 7/086 |
| 2020/0044721 | A1* | 2/2020 | Choi | H04L 5/00 |
| 2020/0059290 | A1* | 2/2020 | Pan | H04B 7/088 |

FOREIGN PATENT DOCUMENTS

| | | |
|---|---|---|
| CN | 104734763 A | 6/2015 |
| CN | 104838688 A | 8/2015 |
| CN | 105940699 A | 9/2016 |
| WO | 2015090034 A1 | 6/2015 |
| WO | 2015119076 A1 | 8/2015 |

OTHER PUBLICATIONS

R1-1609080 Samsung,"Overview on beam management",3GPP TSG RAN WG1 #86-bis,Lisbon, Portugal Oct. 10-14, 2016,total 5 pages.
3GPP TS 36.211 V14.1.0 (Dec. 2016),3rd Generation Partnership Project;Technical Specification Group Radio Access Network;Evolved Universal Terrestrial Radio Access (E-UTRA);Physical channels and modulation(Release 14),total 175 pages.
3GPP TS 36.321 V14.1.0 (Dec. 2016),3rd Generation Partnership Project;Technical Specification Group Radio Access Network;Evolved Universal Terrestrial Radio Access (E-UTRA);Medium Access Control (MAC) protocol specification (Release 14),total 98 pages.
R1-1609415 Huawei, HiSilicon,"Discussion on beam management aspects for UL MIMO",3GPP TSG RAN WG1 Meeting #86bis,Lisbon, Portugal, Oct. 10-14, 2016,total 4 pages.
3GPP TS 36.213 V14.0.0 (Sep. 2016),3rd Generation Partnership Project;Technical Specification Group Radio Access Network;Evolved Universal Terrestrial Radio Access (E-UTRA);Physical layer procedures(Release 14),total 406 pages.
International Search Report and Written Opinion issued in International Application No. PCT/CN2018/071272 dated Mar. 28, 2018, 10 pages.
R1-1609691—Xinwei, "Beam Management Views and Designs,", 3GPP TSG RAN WG1 Meeting #86b, Lisbon, Portugal; Oct. 10-14, 2016, XP051158560, 12 pages.
Extended European Search Report issued in European Application No. 18736341.1 dated May 29, 2019, 5 pages.
Office Action issued in Indian Application No. 201817047493 dated Jul. 2, 2020, 6 pages.
Office Action issued in Chinese Application No. 201880005886.5 dated Nov. 4, 2020, 13 pages (with English translation).

* cited by examiner

R/F2/E/LCID subheader

UPLINK MEASUREMENT SIGNAL INDICATION METHOD AND APPARATUS

CROSS-REFERENCE TO RELATED APPLICATIONS

This application is a continuation of International Application No. PCT/CN2018/071272, filed on Jan. 4, 2018, which claims priority to Chinese Patent Application No. 201710007683.7, filed on Jan. 5, 2017; The disclosures of the aforementioned applications are hereby incorporated by reference in their entireties.

TECHNICAL FIELD

The present disclosure relates to the field of wireless communications, and more specifically, to an uplink measurement signal indication method and an apparatus.

BACKGROUND

In a wireless communications system, radio resource management may be performed by using a measurement method of an uplink measurement signal. To be specific, a terminal device sends an uplink measurement signal, for example, a synchronization signal (SS), a sounding reference signal (SRS), or a beam reference signal (BRS). For example, a base station estimates quality of an uplink channel by detecting an SRS sent by the terminal device, and can perform corresponding resource allocation and transmission parameter selection, or other corresponding radio resource management based on a status of the uplink channel.

To meet high-capacity and high-rate transmission requirements of a mobile communications system, a high-frequency band greater than 6 GHz is introduced for communication, to utilize large-bandwidth and high-rate transmission characteristics of the high-frequency band. Due to a high path loss of high-frequency communication, a propagation distance and a high beam gain need to be ensured by using a narrow beam. One or more uplink or downlink beams may be used between a base station and a terminal device for communication, to form different beam pairs. Different beam pairs have different channel environments. Therefore, channel quality obtained through measurement based on different beam pairs is also different. In addition, a beam pair that is between the base station and the terminal device and that can be used for communication may change frequently due to, for example, reasons such as a channel environment change or moving of the terminal device. Therefore, for a multi-beam communications network, how to send an uplink measurement signal based on a beam is a problem that needs to be resolved.

SUMMARY

The present disclosure provides an uplink measurement signal indication method and an apparatus, so that a terminal device sends an uplink measurement signal based on a corresponding beam.

According to a first aspect, an uplink measurement signal indication method is disclosed, including:

receiving, by a terminal device, signaling sent by a network device, where the signaling carries indication information that indicates a transmit beam for sending an uplink measurement signal by the terminal device; and sending, by the terminal device, the uplink measurement signal to the network device based on the indication information by using the corresponding transmit beam.

According to another aspect, a network device sends signaling to a terminal device, where the signaling carries indication information that indicates a transmit beam for sending an uplink measurement signal by the terminal device, so that the terminal device sends the uplink measurement signal to the network device based on the indication information by using the corresponding transmit beam.

Further, the network device receives the uplink measurement signal that is sent by the terminal device by using the corresponding transmit beam.

The signaling may be layer 1 or layer 2 control signaling, or may be RRC (radio resource control) signaling.

According to a second aspect, an uplink measurement signal indication method is disclosed, including:

receiving, by a terminal device, an indication message sent by a network device, where the indication message carries indication information that indicates a transmit beam for sending an uplink measurement signal by the terminal device; and sending, by the terminal device, the uplink measurement signal to the network device based on the indication information by using the corresponding transmit beam.

According to another aspect, a network device sends an indication message to a terminal device, where the indication message carries indication information that indicates a transmit beam for sending an uplink measurement signal by the terminal device, so that the terminal device sends the uplink measurement signal to the network device based on the indication information by using the corresponding transmit beam.

Further, the network device receives the uplink measurement signal that is sent by the terminal device by using the corresponding transmit beam.

The indication message may be an RRC message, or may be a layer 1 or layer 2 message.

According to a third aspect, an uplink measurement signal indication method is disclosed, including:

receiving, by a terminal device, uplink measurement signal configuration information sent by a network device, where the uplink measurement signal configuration information carries indication information that indicates a transmit beam for sending an uplink measurement signal by the terminal device; and sending, by the terminal device, an uplink measurement signal to the network device based on the configuration information by using the corresponding transmit beam.

According to still another aspect, a network device sends uplink measurement signal configuration information to a terminal device, where the uplink measurement signal configuration information carries indication information that indicates a transmit beam for sending an uplink measurement signal by the terminal device, so that the terminal device sends the uplink measurement signal to the network device based on the configuration information by using the corresponding transmit beam.

According to a fourth aspect, the terminal device in each of the foregoing aspects is further disclosed. The terminal device includes:

a receiving module, configured to receive signaling or an indication message sent by a network device, where the signaling or the indication message carries indication information that indicates a transmit beam for sending an uplink measurement signal by the terminal device; and a sending module, configured to send the uplink measurement signal to the network device based on the indication information by using the corresponding transmit beam.

According to still another aspect, the network device in each of the foregoing aspects is further disclosed. The network device includes:

a sending module, configured to send signaling or an indication message to a terminal device, where the signaling or the indication message carries indication information that indicates a transmit beam for sending an uplink measurement signal by the terminal device, so that the terminal device sends the uplink measurement signal to the network device based on the indication information by using the corresponding transmit beam.

With reference to the foregoing aspect, the network device further includes:

a receiving module, configured to receive the uplink measurement signal that is sent by the terminal device by using the corresponding transmit beam.

The configuration information may be carried in an RRC message, or may be carried in a layer 1 or layer 2 message.

In addition, the configuration information and the indication information may be sent separately. For example, the configuration information is sent first, and then the indication information is sent; or the indication information is sent first, and then the configuration information is sent.

In the solutions of the foregoing aspects, the RRC message or the signaling may carry related information by using a newly added field or an existing field.

With reference to the solutions of the foregoing aspects, the indication information that indicates the transmit beam for sending the uplink measurement signal by the terminal device includes at least one of the following: an identifier of the transmit beam of the terminal device; an identifier of a transmit-receive beam pair between the network device and the terminal device; an identifier of a receive beam of the network device; a QCL (quasi co-location) identifier; an identifier of a receive beam of the terminal device; an identifier of a transmit beam of the network device; an association relationship between a transmit beam of the uplink measurement signal and a transmit beam of another signal; and an association relationship between a transmission resource of the uplink measurement signal and a transmission resource of another signal.

The layer 1 signaling may be downlink control information (DCI), and the layer 2 signaling may be a MAC CE (Media Access Control control element), or may be another type of signaling.

With reference to the foregoing aspects, the indication information is carried in an SRS request field or an SRS beam index in the DCI, or the indication information is carried in a logic index in the MAC CE.

In addition, a MAC PDU (protocol data unit) specially used to indicate beam information may also be newly added. The MAC PDU includes at least the foregoing MAC CE that is used to indicate the beam information.

The MAC PDU may indicate single-beam information of one terminal device; may indicate multi-beam information of one terminal device, and in this case, may include a plurality of MAC CEs; or may indicate information about one or more beams of a plurality of terminal devices, and in this case, needs to include a plurality of MAC CEs, and a plurality of corresponding MAC subheaders need to indicate information about the terminal devices, to be corresponding to the MAC CEs of the terminal devices.

With reference to the foregoing aspects, the uplink measurement signal is a synchronization signal (SS), an SRS, a beam reference signal (BRS), or an uplink tracking signal UL tracking signal, or may be another type of uplink measurement signal.

With reference to the foregoing aspects, the transmit beam of the terminal device may be a physical beam, or may be a logical beam, for example, a logical beam obtained through weighting performed on a plurality of physical beams.

In the solutions of the foregoing aspects of the present disclosure, because the terminal device receives the indication information that indicates the transmit beam for sending the uplink measurement signal by the terminal device, the terminal device may send the uplink measurement signal by using the corresponding transmit beam, so that the network device performs uplink signal measurement based on a beam.

BRIEF DESCRIPTION OF DRAWINGS

To describe the technical solutions in some embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Embodiments of the present disclosure may be applied to wireless networks of various technologies. A radio access network device may include a different network element in a different system. For example, in LTE (Long Term Evolution), LTE-A (LTE Advanced), and 5G NR (new radio), network elements in a radio access network include an eNB (evolved NodeB), a TRP (transmission reception point), and the like, and WLAN (wireless local area network)/Wi-Fi network elements include an access point (AP), and the like. Another wireless network may also use a solution similar to the embodiments of the present disclosure, except that a related module in a base station system may be different. This is not limited in the embodiments of the present disclosure.

It should also be understood that in the embodiments of the present disclosure, a terminal device includes but is not limited to user equipment (UE), a mobile station (MS), a mobile terminal, a mobile phone, a handset, a portable device, or the like. The user equipment may communicate with one or more core networks by using a radio access network (RAN). For example, the user equipment may be a mobile phone (or referred to as a "cellular" phone), a computer with a wireless communications function, or the like, or the user equipment may be a portable, pocket-sized, handheld, computer built-in, or in-vehicle mobile apparatus.

Radio resource management may be performed based on a measurement method of an uplink measurement signal. To be specific, the terminal device sends an uplink measurement signal, for example, an SRS or another type of measurement signal; and a base station or a transmission reception point (TRP) associated with the terminal device, and a neighboring base station or neighboring TRP measure the uplink signal sent by the terminal device, compare measurement results obtained by the base stations or the TRPs, and make a decision, to determine that the terminal device is handed over to an appropriate cell for service. In a 5G system, a base station may include one or more TRPs, and a cell may be a coverage area formed by one or more TRPs.

In a high-frequency communication process, a propagation distance and a high beam gain need to be ensured by using a narrow beam, and beam alignment needs to be performed to ensure communication quality. Therefore, a network device communicates with different terminal devices on different beam pairs. The terminal device sends a measurement signal by using a transmit beam (TX beam), and the network device receives the measurement signal by using a corresponding receive beam (RX beam).

An example in which the uplink measurement signal is an SRS is used. Sending of the SRS is jointly controlled by two types of information. One type of information is used to configure a resource required for sending the SRS, such as a time resource, a frequency resource, or a code resource, and the resource may be configured by using a system message and RRC signaling. The other type of information is used to trigger periodic or aperiodic sending of the SRS, and the sending may be triggered by RRC signaling or DCI.

The system message (SIB2) provides configuration information of a cell-level SRS. The system message mainly indicates a time-frequency location at which the SRS may occur. A time-domain location is a subframe in which the SRS may occur, and a frequency-domain location is a frequency-domain bandwidth allowed for SRS sending. The system message aims to instruct another terminal device in a cell to avoid the time-frequency location at which the SRS may occur when sending a PUSCH, so as to perform accurate uplink channel state measurement. RRC configuration information is used to indicate user-level information, including a user-specific time-domain location, a user-specific frequency-domain location, and SRS sequence information.

An LTE (Long Term Evolution) standard defines transmission manners of two types of SRSs:

periodic SRS (corresponding to a trigger type 0): triggered by an RRC configuration; and aperiodic SRS (corresponding to a trigger type 1): for an FDD (frequency division duplex) mode, a base station eNodeB may trigger, by using DCI format 0/4/1A, UE to send an aperiodic SRS; and for a TDD (time division duplex) mode, an eNodeB may trigger, by using DCI format 0/4/1A/2B/2C, UE to send an aperiodic SRS.

Therefore, in a multi-beam communications system, uplink measurement needs to be performed for different beams. To be specific, a base station needs to configure information about an uplink measurement signal for different beams of a terminal device, including a time-domain location and a frequency-domain location of the uplink measurement signal and sequence information of the uplink measurement signal when a corresponding beam is sent.

A beam pair between the base station and the terminal device that can be used for communication changes frequently. Therefore, a configuration of the uplink measurement signal needs to be updated in time. A beam pair change is mainly caused by the following two categories of reasons:

On one hand, due to a channel environment change, the base station and the terminal device generate new beams for communication. On the other hand, because a beam has a narrow coverage area, as the terminal device moves, beams or a beam pair between the base station and the terminal device that can be used for communication changes frequently.

Therefore, for a multi-beam communications network, channel state information of a narrow beam needs to be obtained accurately, so that the terminal device can send the uplink measurement signal by using a corresponding transmit beam, and the network device can perform measurement based on a beam, and further, the uplink measurement signal can be quickly re-configured when a communications beam changes.

Figure 1:
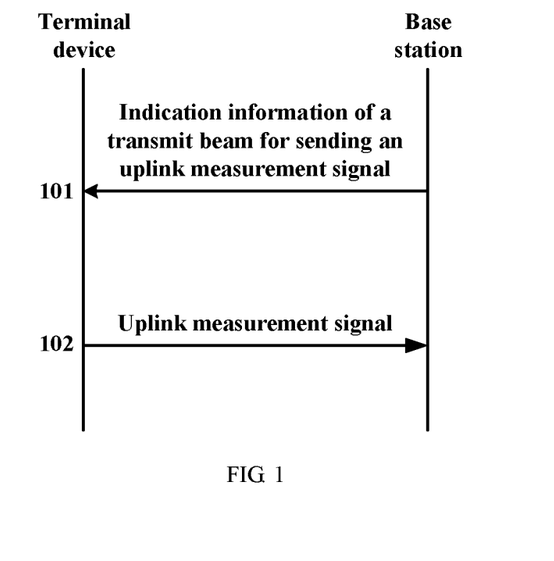
FIG. 1 is a flowchart of an uplink measurement signal indication method according to an embodiment of the present disclosure.

An embodiment of the present disclosure provides an uplink measurement signal indication method. Referring to FIG. 1, the method includes the following steps:

101. A network device sends signaling to a terminal device, where the signaling carries indication information that indicates a transmit beam for sending an uplink measurement signal by the terminal device.

102. The terminal device sends the uplink measurement signal to the network device based on the indication information by using the corresponding transmit beam.

Further, the network device may receive the uplink measurement signal that is sent by the terminal device by using the corresponding transmit beam, so that the network device can perform uplink signal measurement based on a beam.

The signaling may be layer 1 or layer 2 control signaling, or may be RRC signaling. The signaling may alternatively be a message, for example, a layer 1 or layer 2 message or an RRC message.

In the embodiment of the present disclosure, the RRC message or the signaling may carry related information by using a newly added field or an existing field.

The uplink measurement signal may be a synchronization signal SS, an SRS, or a BRS, or may be another type of measurement signal, for example, an uplink tracking signal. This is not limited in this embodiment of the present disclosure.

A transmit beam for sending an uplink measurement signal by the terminal device is an uplink transmit beam. The terminal device sends the uplink measurement signal based on the indication information by using the uplink transmit beam.

The indication information that indicates the transmit beam for sending the uplink measurement signal by the terminal device includes at least one of the following:

related information about the transmit beam of the terminal device, related information about a transmit-receive beam pair between the network device and the terminal device, related information about a receive beam of the network device, related information about a QCL, related information about the terminal device, and related information about the network device.

For example, the indication information includes at least one of the following: an identifier of the transmit beam of the terminal device, an identifier of the transmit-receive beam pair between the network device and the terminal device, an identifier of the receive beam of the network device, a QCL identifier, an identifier of a receive beam of the terminal device, and an identifier of a transmit beam of the network device.

The indication information may alternatively include an association relationship between a transmission configuration of the uplink measurement signal and a transmission configuration of another signal, or an association relationship between a transmission resource of the uplink measurement signal and a transmission resource of another signal. The another signal is a signal other than the uplink measurement signal, and may be an already sent signal, for example, a previously sent signal. The transmission configuration may include a transmit beam. The transmission resource may include a time-frequency-code resource. The terminal device may send the uplink measurement signal based on the indication information by using a transmit beam previously used for sending the another signal; or send the uplink measurement signal by using a time-frequency-code resource previously used for sending the another signal; or determine a transmit beam based on a time-frequency-code resource previously used for sending the another signal, and then send the uplink measurement signal by using the beam.

In addition, the indication information may be carried in configuration information of the uplink measurement signal, and sent along with the configuration information. For example, the configuration information includes time-frequency-code information and beam indication information, and is sent by using the RRC message. Alternatively, the indication information and the configuration information may be sent separately. To be specific, the configuration information is sent first, and then the indication information is sent; or the indication information is sent first, and then the configuration information is sent.

The layer 1 control signaling may be DCI, and the layer 2 control signaling may be a MAC CE.

The network device may be a base station, a TRP, or the like. In this embodiment, a description is provided based on an example in which the network device is a base station.

The transmit beam may be a physical beam, or may be a logical beam, for example, a logical beam obtained through weighting performed on a plurality of physical beams. A weighted value may be obtained based on a configured code-domain resource, or may be obtained through calculation based on a channel measurement result, or may be obtained in another manner. This is not limited in this embodiment.

The following separately describes the foregoing several types of indication information.

When the indication information is an identifier of the transmit beam of the terminal device, the layer 1 or layer 2 control signaling may directly carry the identifier of the transmit beam of the terminal device, or may directly carry a logical identifier of the beam. If the indication information directly indicates a transmit beam of the terminal device, a relatively large quantity of bits are required because the terminal device has a relatively large quantity of transmit beams. In an actual communication process, due to a coverage characteristic of a narrow beam, the base station and the terminal device can use only a small quantity of beams for communication within a period of time. Therefore, logical identifiers of beams may be maintained at receive and transmit ends, to reduce signaling overheads caused by exchange of beam identifiers.

For example, after completing beam scanning, the base station and the terminal device may generate and separately store a beam logical-identifier mapping table. The layer 1 or layer 2 control signaling sent by the base station may include a logical identifier of a transmit beam of the terminal device, or uplink measurement configuration information generated by the base station may include a logical identifier of a beam. The following table is used as an example. The terminal device usually supports 16 physical beams, and identifiers of the 16 physical beams require four bits. If only a maximum of four physical beams used for communication can be maintained, use of logical identifiers requires only two bits, thereby reducing signaling overheads.

For example, in the following table, when the indication information sent by the base station and received by the terminal device indicates that a logical identifier of a transmit beam is 1, it can be learned from the locally maintained logical-identifier mapping table that an identifier of the transmit beam is 12.

| Logical identifier of a beam on a terminal device side | Identifier of a transmit beam on the terminal device side |
| --- | --- |
| 1 | 12 |
| 2 | 13 |
| 3 | 14 |
| 4 | 15 |

In addition, the indication information may alternatively be an identifier of a receive beam of the terminal device. The terminal device can determine a transmit beam based on the identifier of the receive beam of the terminal device.

When the indication information is an identifier of a transmit-receive beam pair between the network device and the terminal device, the layer 1 or layer 2 control signaling may directly carry the identifier of the beam pair. After receiving the identifier of the beam pair, the terminal device can learn of a corresponding transmit beam based on a maintained transmit-receive beam pair list. The identifier of the beam pair may include an identifier of the transmit beam of the terminal device and an identifier of a receive beam of the network device, or may include an identifier of a receive beam of the terminal device and an identifier of a transmit beam of the network device; or the identifier of the beam pair is a logical identifier, and the terminal device can determine the transmit beam based on the logical identifier.

For example, after completing beam scanning, the base station and the terminal device separately maintain the transmit-receive beam pair list (a mapping table), and number a beam pair, for example:

| Identifier of a beam pair | Receive beam on a base station side | Transmit beam on a UE side |
| --- | --- | --- |
| 1 | 1 | 12 |
| 2 | 2 | 13 |
| 3 | 2 | 14 |
| 4 | 3 | 15 |

The base station may add the foregoing identifier of the beam pair to the layer 1 or layer 2 control signaling, or to RRC message, or to the configuration information of the uplink measurement signal. For example, if the base station adds a beam pair number 1 to the configuration information when configuring the uplink measurement signal, the terminal device can determine that the uplink measurement signal is to be sent on a transmit beam 12.

The indication information may alternatively be an identifier of a QCL defined in an LTE standard. The layer 1 or layer 2 control signaling carries the QCL to indicate a transmit beam of the terminal device.

The QCL has a detailed definition in the 3GPP TS 36.211. QCL information is obtained based on different beam pairs. There may be different QCLs between different antenna pairs. Therefore, QCL identifiers may be used to distinguish between different beam pairs. Similar to the foregoing embodiment, the base station and the terminal device may maintain a table in the following form.

| QCL identifier | Receive beam on a base station side | Transmit beam on a UE side |
|---|---|---|
| 1 | 1 | 12 |
| 2 | 2 | 13 |
| 3 | 2 | 14 |
| 4 | 3 | 15 |

Therefore, the terminal device may obtain, based on a received QCL identifier, an identifier of a transmit beam to be used for sending the uplink measurement signal. The base station may add the foregoing QCL identifier to the layer 1 or layer 2 control signaling, or to RRC message, or to the configuration information of the uplink measurement signal. For example, if the base station adds a QCL identifier 1 when configuring the uplink measurement signal, the terminal device can determine from the table that a transmit beam 12 is to be used for sending the uplink measurement signal.

The indication information may alternatively be information of a receive beam of the network device, for example, an identifier of the receive beam of the network device, provided that both receive and transmit parties maintain beam pair information. For example, the base station may add information of the receive beam to the layer 1 or layer 2 control signaling or the configuration information of the uplink measurement signal. Because the receive beam of the base station may be corresponding to a transmit beam of one terminal device or transmit beams of a plurality of terminal devices, there are the following several cases after the terminal device receives the identifier of the receive beam of the base station.

If there is a one-to-one correspondence between receive beams of the base station and transmit beams of the terminal device, a transmit beam may be obtained directly.

If a one-to-many relationship shown in the following table exists between receive beams of the base station and transmit beams of the terminal device, for example, a receive beam of one base station is corresponding to transmit beams of N terminal devices, three optional manners may be available:
  sending the uplink measurement signal on one beam selected from N beams;
  sending the uplink measurement signal on all N beams; and
  sending the uplink measurement signal alternately on N beams.

For example, in the following table, an identifier of a receive beam of the base station is 2, and corresponding transmit beams are 13 and 14 of the terminal device. The terminal device may send the uplink measurement signal simultaneously on the two beams 13 and 14, or on either of the two beams 13 and 14, or alternately on the two beams 13 and 14.

| Identifier of a beam pair | Receive beam on a base station side | Transmit beam on a UE side |
|---|---|---|
| 1 | 1 | 12 |
| 2 | 2 | 13 |
| 3 | 2 | 14 |
| 4 | 3 | 14 |

If there is a many-to-one relationship between receive beams of the base station and transmit beams of the terminal device, a transmit beam of the terminal device can be uniquely determined based on a receive beam of the base station.

After receiving the identifier of the receive beam of the network device, the terminal device can determine a corresponding transmit beam based on the maintained beam pair information, and send the uplink measurement signal by using the transmit beam.

In another example, the indication information may alternatively be an identifier of a transmit beam of the network device. The terminal device can determine a transmit beam based on the identifier of the transmit beam of the network device.

In addition, the indication information that indicates the transmit beam for sending the uplink measurement signal by the terminal device includes an association relationship between a transmit beam of the uplink measurement signal and a transmit beam of another signal, or an association relationship between a transmission resource of the uplink measurement signal and a transmission resource of another signal, so that the terminal device can send the uplink measurement signal based on the indication information by using the transmit beam or transmission resource of the another signal. The another signal is a signal other than the uplink measurement signal, for example, data, a beam reference signal (BRS), or a random access channel (RACH). Alternatively, the indication information may include a transmit beam or a transmission resource of another signal. The terminal device may send the uplink measurement signal by using the transmit beam or the transmission resource of the another signal, or determine a transmit beam based on the transmission resource, and send the uplink measurement signal.

For example, the indication information may include an association relationship between a transmission configuration/transmission resource of the uplink measurement signal and a transmission configuration/transmission resource of the another signal, for example, an association relationship between the transmission configuration of the uplink measurement signal and a configuration of an already sent signal (for example, a transmit beam of the already sent signal), or an association relationship between the transmission resource of the uplink measurement signal and a transmission resource of an already sent signal.

Specifically, the indication information may be an association relationship between the transmission configuration of the uplink measurement signal and a configuration (for example, a transmit beam) of a previously sent signal, or an association relationship between the transmission resource of the uplink measurement signal and a transmission resource of a previously sent signal. An association relationship may be configured in a predefined manner or a real-time manner. Further, the configured association relationship may be periodic and can be changed, or may be used for single sending only.

For example, before the uplink measurement signal is sent, the network device may have configured a transmit beam for sending data Data, a beam reference signal BRS, or a random access channel RACH. In this case, an association relationship regarding transmit beams between the uplink measurement signal, for example, an SRS, and the foregoing several signals may be indicated by using one or more bits, and the association relationship is carried in DCI or a MAC CE, as shown in the following table.

| Value of index | Description |
| --- | --- |
| 00 | Mapped to the beam for RACH |
| 01 | Mapped to the beam for BRS |
| 10 | Mapped to the beam for Data |
| 00 | Reserved |

After receiving indication information in the table, the terminal device determines, based on a value, to use a corresponding transmit beam of the another signal to send the uplink measurement signal. For example, if the indication information is 00, a transmit beam used for sending the RACH is to be used for sending the SRS; if the indication information is 01, a transmit beam used for sending the BRS is to be used for sending the SRS; and if the indication information is 10, a transmit beam used for sending the data is to be used for sending the SRS.

In addition, in another embodiment, the foregoing indication information may alternatively not be used. Instead, an association relationship between a transmit beam of the uplink measurement signal and a transmit beam of another signal (for example, an already sent signal) is predefined, or an association relationship between a transmission resource of the uplink measurement signal and a transmission resource of another signal (for example, an already sent signal) is predefined, for example, an association relationship between the transmit beam of the uplink measurement signal and a beam of a previously sent signal, or an association relationship between the transmission resource of the uplink measurement signal and a transmission resource of a previously sent signal. The terminal device sends the uplink measurement signal by directly following a predefined rule, for example, (1) a defined rule, for example, sending an uplink measurement signal by using a transmit beam used in last transmission; or (2) a defined rule, for example, sending an uplink measurement signal by using a transmit beam of a signal, for example, sending an SRS by using a transmit beam of a RACH or a BRS.

The terminal device may send the uplink measurement signal by directly following the foregoing predefined rule, for example, sending the uplink measurement signal by using a transmit beam used in last transmission, or sending an SRS by using a transmit beam of a RACH or a BRS. The network device may not send indication information.

The foregoing pre-defined rule may be configured by using RRC or in an initialization process, or certainly, may be configured in a manner in which the network device sends the indication information.

An example in which the uplink measurement signal is an SRS is used for description. For example, time-frequency-code information of the SRS may be configured by using a system message and RRC signaling, whereas DCI may provide only information about a transmit beam. A corresponding scenario may be a beam change, but a configuration about the SRS on the beam is not changed.

An example in which layer 1 control signaling is the DCI is used. Indication information that indicates a transmit beam for sending an uplink measurement signal by the terminal device is carried by using the DCI.

In a multi-beam communications system, a base station and the terminal device can use only a small quantity of beam pairs for communication within a same period of time. Therefore, the base station and the terminal device merely need to maintain a small quantity of QCL identifiers or beam pair identifiers. The transmit beam indication information in the DCI may be implemented in the following four manners.

(1) Several bits, for example, two or three bits, may be added to an original SRS request field in the DCI, and are used to indicate information about a transmit beam for sending an uplink measurement signal by the terminal device, for example, several types of identification information mentioned above, for example, an identifier of the transmit beam of the terminal device, an identifier of a transmit-receive beam pair between the network device and the terminal device, an identifier of a receive beam of the network device, or a QCL identifier.

An example in which three bits are added is used herein. The following table shows a method of adding a beam-related identifier to an existing protocol field. A 3-bit beam indication may be added to an original 2-bit SRS request field in DCI format 4, to reuse a table of an existing protocol. For a related protocol, refer to the 3GPP TS36.123.

TABLE 8.1-1

| SRS request value for trigger type 1 in DCI format 4 | |
| --- | --- |
| Value of SRS request field | Description |
| '00xxx' | No type 1 SRS trigger |
| '01xxx' | The 1$^{st}$ SRS parameter set configured by higher layers for beam with index xxx |
| '10xxx' | The 2$^{nd}$ SRS parameter set configured by higher layers for beam with index xxx |
| '11xxx' | The 3$^{rd}$ SRS parameter set configured by higher layers for beam with index xxx | xxx are newly added bits, with a value ranging from 000 to 111, and are used to indicate transmit beam identifiers 0 to 7 or 1 to 8.

Alternatively, in DCI format 0, whether an aperiodic SRS is triggered may be indicated by using a 1-bit SRS request field. 1 indicates that the aperiodic SRS is triggered, and 0 indicates that the aperiodic SRS is not triggered. A table may be newly added for description, as shown below.

TABLE 8.1-2

| SRS request value for trigger type 1 in DCI format 0 | |
| --- | --- |
| Value of SRS request field | Description |
| '0xxx' | No type 1 SRS trigger |
| '1xxx' | type 1 SRS trigger for beam with index xxx |

With a value ranging from 000 to 111, xxx are used to indicate transmit beam identifiers 0 to 7 or 1 to 8.

(2) An SRS beam index field may be added to a DCI format, and an existing definition of an SRS request field remains unchanged. An example in which the SRS beam index field has three bits is used herein to display a definition of the new field.

TABLE 8.1-2

SRS beam index value

| Value of SRS beam index | Description |
|---|---|
| '000' | SRS sending with beam index 0 |
| '001' | SRS sending with beam index 1 |
| '010' | SRS sending with beam index 2 |
| '011' | SRS sending with beam index 3 |
| '100' | SRS sending with beam index 4 |
| '101' | SRS sending with beam index 5 |
| '110' | SRS sending with beam index 6 |
| '111' | SRS sending with beam index 7 |

Different values in the foregoing table respectively represent beams 0 to 7. A criterion may be newly added. The SRS beam index field may be combined with the SRS request field, to ultimately determine a transmit beam that implements a specific configuration. For example, when an SRS beam index is '000' and a 1-bit SRS request field is set to 1, a beam 0 is used for sending the SRS. Considering that the SRS request field has a higher priority, when the SRS request field is set to 0, no beam is used for sending.

(3) An SRS beam index field is also added to a DCI format, and an existing definition of an SRS request field remains unchanged. A difference from the previous example is that a criterion newly added in this case is as follows: The SRS beam index field has a higher priority. Once the SRS beam index field has a valid value, the SRS is sent regardless of whether the SRS request field is set to 1.

An example in which the SRS beam index field has three bits is used to display a definition of the new field.

TABLE 8.1-2

SRS beam index value

| Value of SRS beam index | Description |
|---|---|
| '000' | No SRS trigger |
| '001' | SRS sending with beam index 1 |
| '010' | SRS sending with beam index 2 |
| '011' | SRS sending with beam index 3 |
| '100' | SRS sending with beam index 4 |
| '101' | SRS sending with beam index 5 |
| '110' | SRS sending with beam index 6 |
| '111' | SRS sending with beam index 7 |

Different values in the foregoing table separately represent beams 1 to 7. Under the new criterion, for a 1-bit SRS request field, if the SRS beam index field is set to 000 and the 1-bit SRS request field is set to 0, no SRS sending is performed; otherwise, the SRS is sent by using a beam indicated by the SRS beam index field.

For a 2-bit SRS request field, if the SRS beam index field is set to '000' and the 2-bit SRS request field is set to '00', no SRS sending is performed; otherwise, if the SRS beam index field is not set to '000', sending is still performed by using a beam indicated by the SRS beam index field even if the 2-bit SRS request field is set to '00'. If both the SRS beam index field and the SRS request field are set to valid values, a beam and an SRS configuration set are selected based on indications.

(4) In addition, an SRS beam index field with a length of eight bits may be added to a DCI format. A form of a bitmap is used to indicate information of a beam to be used for sending the SRS. In this manner, a plurality of beams can be specified at one time to use a same configuration.

For example, eight bits separately represent eight beams 0 to 7. 1 indicates sending, and 0 indicates no sending. When the SRS beam index field is configured to 01001000 and a 1-bit SRS request field is set to 1, the SRS may be sent on both a beam corresponding to an identifier 1 and a beam corresponding to an identifier 4, but not sent on other beams.

The foregoing several manners only use the SRS as an example to describe an indication manner of a transmit beam of the uplink measurement signal. This is not limited to the foregoing implementations.

An example in which layer 2 control signaling is a MAC CE is used. The MAC CE is used to carry indication information that indicates a transmit beam for sending the uplink measurement signal by the terminal device.

Figure 2:
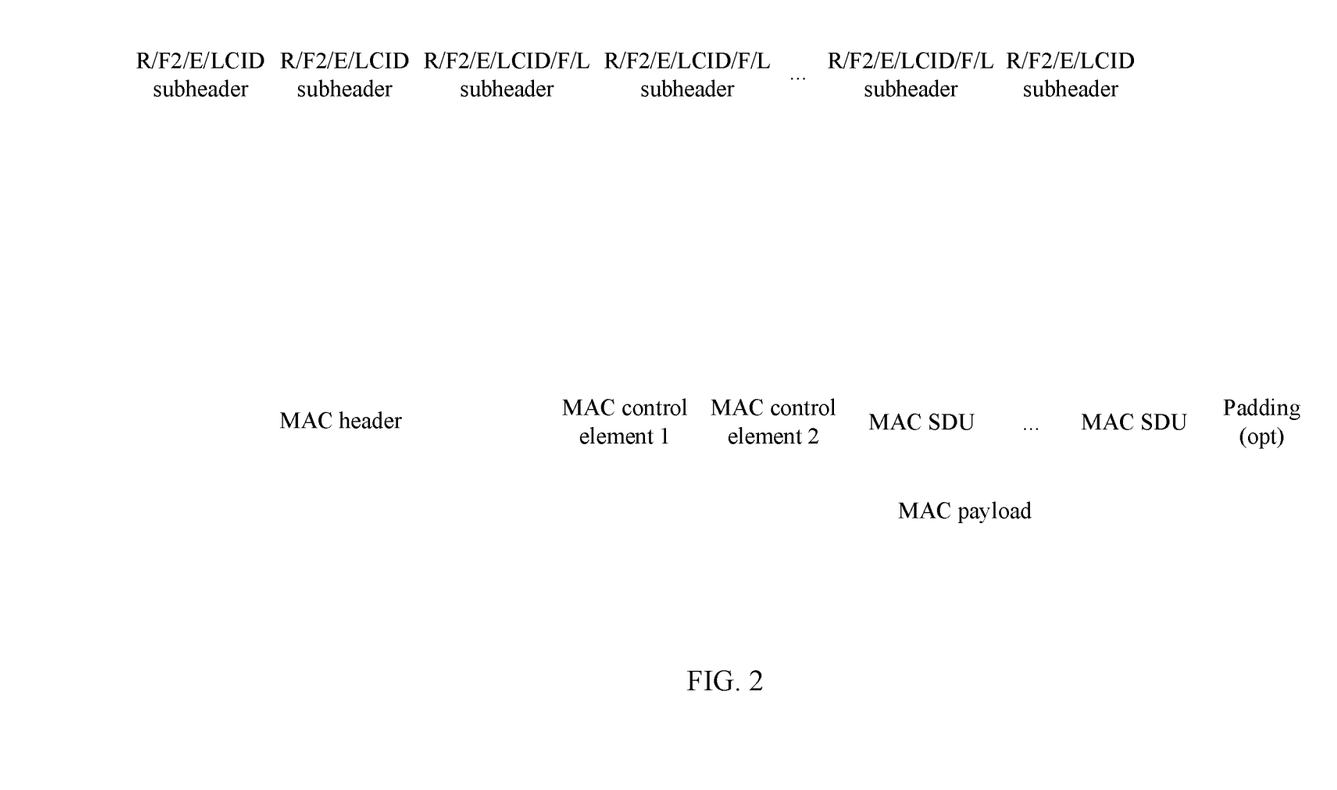
FIG. 2 is a schematic structural diagram of a MAC layer frame according to an embodiment of the present disclosure.

As shown in FIG. 2, MAC layer data defined in LTE is encapsulated in the following format, and then placed in a PDSCH (physical downlink shared channel) or a PUSCH (physical uplink shared channel) for transmission. The encapsulation format includes a MAC header and a MAC payload. For details about other information, refer to the 3GPP TS36.321.

The MAC header also includes many MAC subheaders.

The MAC payload also includes a plurality of parts, including a MAC control element MAC CE (MAC control element), a MAC SDU (MAC service data unit), and a padding field.

Each subheader is corresponding to a MAC CE or a MAC SDU in the payload in a sequential order. A type of a MAC control element is indicated by a logical channel identifier (LCID) of a MAC subheader.

In the following example, a format of a MAC PDU of a DL-SCH (downlink shared channel) and a format of a MAC subheader in the DL-SCH may be reused, and a MAC CE may be newly added to indicate beam information.

Figure 3:
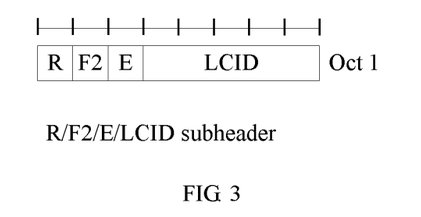
FIG. 3 is a schematic structural diagram of a MAC subheader according to an embodiment of the present disclosure.

The MAC subheader may use a format already defined in a protocol, for example, as shown in FIG. 3. In FIG. 3, an LCID may use a reserved field of TS 36321-e00, and may select 10111 to be associated with the newly defined MAC control element. An updated table is shown as follows.

TABLE 6.2.1-1

Values of LCID for DL-SCH

| Index | LCID values |
|---|---|
| 00000 | CCCH |
| 00001-01010 | Identity of the logical channel |
| 01011-10110 | Reserved |
| 10111 | Beam Index for SRS |
| 11000 | Activation/Deactivation (4 octets) |
| 11001 | SC-MCCH, SC-MTCH (see note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

Figure 4:
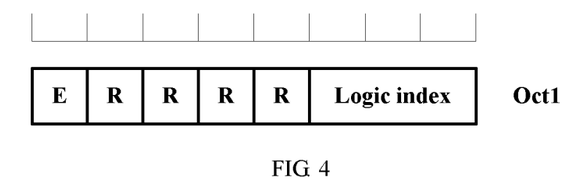
FIG. 4 is a schematic structural diagram of a MAC control element according to an embodiment of the present disclosure.

NOTE:
Both SC-MCCH and SC-MTCH cannot be multiplexed with other logical channels in the same MAC PDU except for Padding A MAC CE that is used to indicate transmit beam information may be newly added in the following at least two available manners:

If the terminal device maintains related information of a maximum of eight beams, three bits are required for beam identifier indication. For example, refer to FIG. 4. In FIG. 4, for E and R fields, refer to definitions in the 3GPP TS36.321.

A newly added field is logic index, occupying three bits and being used to indicate the beam information. FIG. 4 is only an embodiment. The logic index may be placed in another position. A table is newly added to define values of the logic index.

TABLE 6.2.1-2

Values of logic index

| Value of logic index | Description |
| --- | --- |
| '000' | SRS sending with beam index 0 |
| '001' | SRS sending with beam index 1 |
| '010' | SRS sending with beam index 2 |
| '011' | SRS sending with beam index 3 |
| '100' | SRS sending with beam index 4 |
| '101' | SRS sending with beam index 5 |
| '110' | SRS sending with beam index 6 |
| '111' | SRS sending with beam index 7 |

Figure 5:
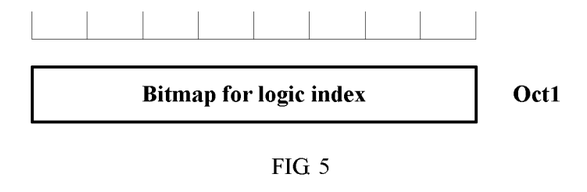
FIG. 5 is a schematic structural diagram of a MAC control element according to another embodiment of the present disclosure.

Referring to FIG. 5, the newly added MAC control element may indicate a plurality of transmit beams directly by using a form of a bitmap. An SRS time configuration, an SRS frequency configuration, and an SRS code configuration that are used by each beam may be configured by using other information. For example, a bitmap configuration occupies eight bits, respectively representing beams 0 to 7. 0 indicates no sending, and 1 indicates sending. When the bitmap is 01001000, the SRS can be sent on both a beam corresponding to an identifier 1 and a beam corresponding to an identifier 4.

In addition, a MAC PDU specially used to indicate the beam information may also be newly added. The MAC PDU includes at least the foregoing MAC CE that is used to indicate the beam information. The MAC PDU may indicate single-beam information of one terminal device; may indicate multi-beam information of one terminal device, and in this case, may include a plurality of MAC CEs; or may indicate information about one or more beams of a plurality of terminal devices, and in this case, needs to include a plurality of MAC CEs, and a plurality of corresponding MAC subheaders need to indicate information about the terminal devices, to be corresponding to the MAC CEs of the terminal devices.

Figure 6:
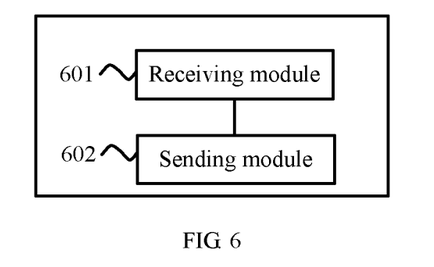
FIG. 6 is a schematic diagram of a network device or a terminal device according to an embodiment of the present disclosure.

For a schematic diagram of the terminal device in the foregoing method embodiment, refer to FIG. 6. The terminal device includes:

a receiving module 601, configured to receive signaling sent by a network device, where the signaling carries indication information that indicates a transmit beam for sending an uplink measurement signal by the terminal device; and a sending module 602, configured to send the uplink measurement signal to the network device based on the indication information by using the corresponding transmit beam.

In the foregoing apparatus embodiment, a corresponding functional module performs a corresponding step of the terminal device in the method embodiment. For specific steps, refer to the corresponding method embodiment. Details are not described herein again.

For a schematic diagram of the network device in the foregoing method embodiment, refer to FIG. 6. The network device includes:

a sending module 602, configured to send signaling to a terminal device, where the signaling carries indication information that indicates a transmit beam for sending an uplink measurement signal by the terminal device, so that the terminal device sends the uplink measurement signal to the network device based on the indication information by using the corresponding transmit beam.

Further, the network device may further include:

a receiving module 601, configured to receive the uplink measurement signal that is sent by the terminal device by using the corresponding transmit beam.

In the foregoing apparatus embodiment, a corresponding functional module performs a corresponding step of the network device in the method embodiment. For specific steps, refer to the corresponding method embodiment. Details are not described herein again.

Figure 7:
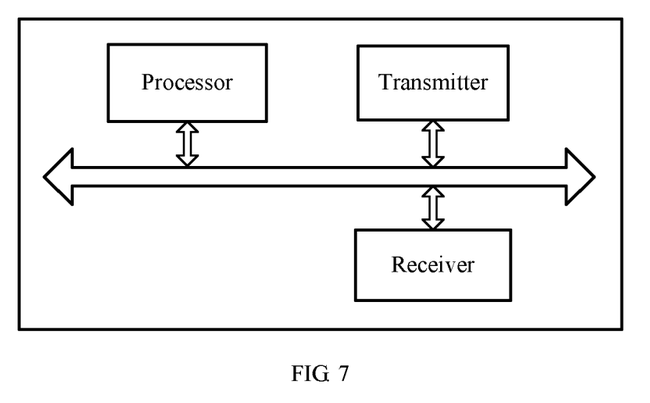
FIG. 7 is a schematic diagram of a network device or a terminal device according to still another embodiment of the present disclosure.

With reference to the foregoing two apparatuses, in an apparatus embodiment in another form, referring to FIG. 7, the receiving module may be implemented by a receiver, and perform a reception operation; the sending module may be implemented by a transmitter, and perform a transmission operation; and corresponding steps other than transmission and reception in the method embodiment may be performed by a processor. For details, refer to a corresponding description in the method embodiment. Details are not described herein again.

Optionally, components of a device in FIG. 7 are coupled together by using a bus system. In addition to a data bus, the bus system further includes a power bus, a control bus, and a status signal bus.

The network device in the foregoing embodiments may be a base station, may be a transmission reception point (TRP), or may be another type of network device.

In the technical solutions of the embodiments of the present disclosure, because the terminal device receives the indication information that indicates the transmit beam for sending the uplink measurement signal by the terminal device, the terminal device may send the uplink measurement signal by using the corresponding transmit beam, so that the network device performs uplink signal measurement based on a beam.

It should be understood that in the embodiments of the present disclosure, the processor may be a central processing unit ("CPU" for short), or the processor may be another general purpose processor, a digital signal processor (DSP), an application-specific integrated circuit (ASIC), a field programmable gate array (FPGA) or another programmable logic device, discrete gate or transistor logic device, discrete hardware component, or the like. The general purpose processor may be a microprocessor, or the processor may be any conventional processor or the like.

A memory may include a read-only memory and a random access memory, and provide an instruction and data to the processor. A part of the memory may further include a nonvolatile random access memory. For example, the memory may further store information of a device type.

The bus system may further include a power bus, a control bus, a status signal bus, and the like, in addition to a data bus. However, for clear description, various types of buses in the figure are marked as the bus system.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present disclosure. The execution sequences of the processes should be determined based on functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the method described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
   receiving, by a terminal device, signaling sent by a network device, wherein the signaling carries indication information that indicates a transmit beam for sending an uplink measurement signal by the terminal device; and
   sending, by the terminal device, the uplink measurement signal to the network device based on the indication information by using the transmit beam;
   wherein the indication information that indicates the transmit beam for sending the uplink measurement signal by the terminal device comprises:
      an association relationship between a transmission resource of the uplink measurement signal and a transmission resource of a downlink signal;
      wherein the association relationship includes one or more bits of the indication information and indicates the transmit beam for sending the uplink measurement signal by the terminal device.

2. The method according to claim 1, wherein the signaling is one of: downlink control information (DCI), Media Access Control control element (MAC CE), or radio resource control (RRC) signaling.

3. The method according to claim 2, wherein the indication information is carried in a sounding reference signal (SRS) request field or an SRS beam index in the DCI; or
   wherein the indication information is carried in a logic index in the MAC CE.

4. The method according to claim 1, wherein the uplink measurement signal is a synchronization signal (SS), a sounding reference signal (SRS), a beam reference signal (BRS), or an uplink tracking signal.

5. The method according to claim 1, wherein the downlink signal is a beam reference signal.

6. A method, comprising:
   sending, by a network device, signaling to a terminal device, wherein the signaling carries indication information that indicates a transmit beam for sending an uplink measurement signal by the terminal device, and wherein the terminal device sends the uplink measurement signal to the network device based on the indication information by using the transmit beam;
   wherein the indication information that indicates the transmit beam for sending the uplink measurement signal by the terminal device comprises:
      an association relationship between a transmission resource of the uplink measurement signal and a transmission resource of a downlink signal;
      wherein the association relationship includes one or more bits of the indication information and indicates the transmit beam for sending the uplink measurement signal by the terminal device.

7. The method according to claim 6, wherein the signaling is one of: downlink control information (DCI), Media Access Control control element (MAC CE), or radio resource control (RRC) signaling.

8. The method according to claim 6, further comprising:
   receiving the uplink measurement signal that is sent by the terminal device by using the transmit beam.

9. The method according to claim 6, wherein the uplink measurement signal is a synchronization signal (SS), a sounding reference signal (SRS), a beam reference signal (BRS), or an uplink tracking signal.

10. The method according to claim 6, wherein the downlink signal is a beam reference signal.

11. An apparatus, wherein the apparatus is a terminal device or a functional device in the terminal device, and wherein the apparatus comprises:
- a receiver, the receiver configured to receive signaling sent by a network device, wherein the signaling carries indication information that indicates a transmit beam for sending an uplink measurement signal by the terminal device; and
- a transmitter, the transmitter configured to send the uplink measurement signal to the network device based on the indication information by using the transmit beam;
- wherein the indication information that indicates the transmit beam for sending the uplink measurement signal by the terminal device comprises:
  - an association relationship between a transmission resource of the uplink measurement signal and a transmission resource of a downlink signal;
- wherein the association relationship includes one or more bits of the indication information and indicates the transmit beam for sending the uplink measurement signal by the terminal device.

12. The apparatus according to claim 11, wherein the signaling is one of: downlink control information (DCI), Media Access Control control element (MAC CE), or radio resource control (RRC) signaling.

13. The apparatus according to claim 11, wherein the uplink measurement signal is a synchronization signal (SS), a sounding reference signal (SRS), a beam reference signal (BRS), or an uplink tracking signal.

14. The apparatus according to claim 11, wherein the downlink signal is a beam reference signal.

15. An apparatus, wherein the apparatus is a network device or a functional device in the network device, and wherein the apparatus comprises:
- a transmitter, the transmitter configured to send signaling to a terminal device, wherein the signaling carries indication information that indicates a transmit beam for sending an uplink measurement signal by the terminal device, and wherein the terminal device sends the uplink measurement signal to the network device based on the indication information by using the transmit beam;
- wherein the indication information that indicates the transmit beam for sending the uplink measurement signal by the terminal device comprises:
  - an association relationship between a transmission resource of the uplink measurement signal and a transmission resource of a downlink signal;
- wherein the association relationship includes one or more bits of the indication information and indicates the transmit beam for sending the uplink measurement signal by the terminal device.

16. The apparatus according to claim 15, further comprising:
- a receiver, the receiver configured to receive the uplink measurement signal that is sent by the terminal device by using the transmit beam.

17. The apparatus according to claim 15, wherein the signaling is one of: downlink control information (DCI), Media Access Control control element (MAC CE), or radio resource control (RRC) signaling.

18. The apparatus according to claim 15, wherein the uplink measurement signal is a synchronization signal (SS), a sounding reference signal (SRS), a beam reference signal (BRS), or an uplink tracking signal.

19. The apparatus according to claim 15, wherein the downlink signal is a beam reference signal.

* * * * *